Feb. 7, 1967    C. O. GLASGOW    3,302,953
GASKET RING AND CONDUIT COUPLING
Filed Feb. 25, 1963    2 Sheets-Sheet 1
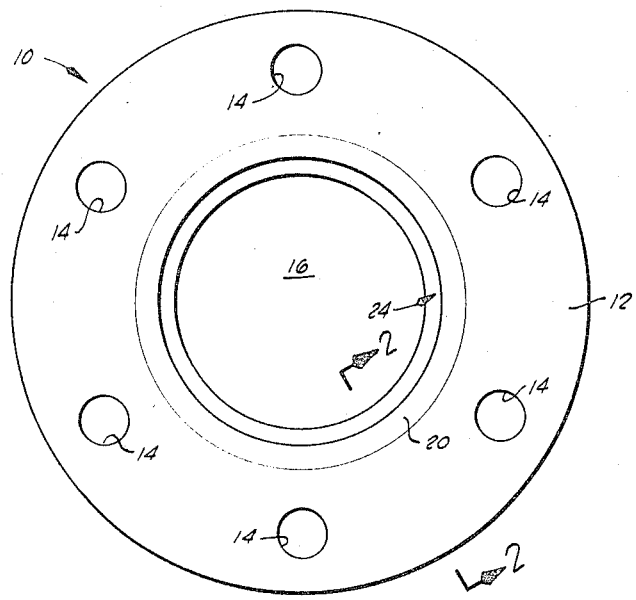
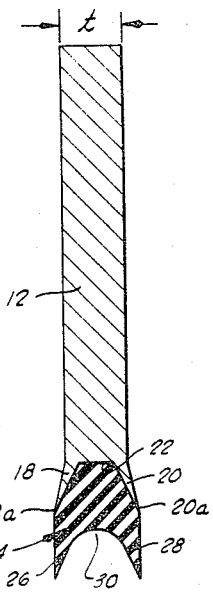
Fig. 1    Fig. 2
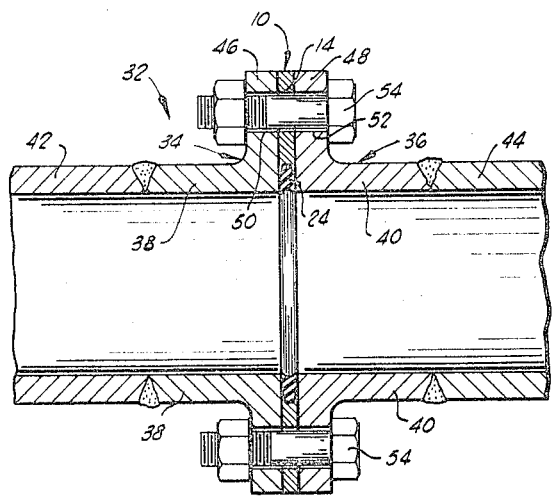
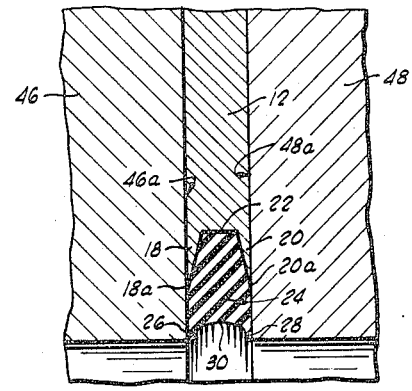
Fig. 3    Fig. 4
INVENTOR.
CLARENCE O. GLASGOW
BY
Dunlap Laney & Hubbard
ATTORNEYS Feb. 7, 1967  C. O. GLASGOW  3,302,953
GASKET RING AND CONDUIT COUPLING
Filed Feb. 25, 1963  2 Sheets-Sheet 2

INVENTOR.
CLARENCE O. GLASGOW
BY
Dunlap, Laney & Hubbard
ATTORNEYS

United States Patent Office 3,302,953
Patented Feb. 7, 1967

3,302,953
GASKET RING AND CONDUIT COUPLING
Clarence O. Glasgow, 2620 S. Yorktown,
Tulsa, Okla. 74104
Filed Feb. 25, 1963, Ser. No. 260,369
2 Claims. (Cl. 277—180)

The present invention relates to pipe couplings and more particularly, but not by way of limitation, relates to an improved gasket ring for bolted flange or union type couplings and to improved flange type and union type couplings.

As is well known in the pipe fitting art, there are many instances when it is necessary to provide a fluid-tight connection between two joints of pipe or other conduit means after the joints have been installed in such a manner that neither of the conduits can be rotated. In this type of connection the two joints of pipe are axially aligned with the ends in abutting relationship, and the coupling positioned around the ends of the stationary joints. Generally speaking, there are three types of couplings used for this type of connection: those which use a peripheral seal around the outside of the joint of pipe, those which use a peripheral seal around the inside of the pipe, and those which provide an annular seal between the abutting ends of the pipe. The present invention is concerned with couplings of the last type which have sealing faces disposed generally normal to the longitudinal axis of the conduits.

These types of couplings are used extensively around refineries, chemical plants and power plants in which a large amount of piping must be fitted into a small space. Much of the piping must carry heated fluids and accordingly is subjected to a relatively high range of temperatures. As a result it is not uncommon for the pipe couplings to leak after the heat has expanded the fastening means because repeated heating and cooling has loosened the fastening means. The problem is particularly acute around petroleum refineries or other chemical plants handling inflammable material, because in the event of a fire the pipe joints will quickly be heated to very high temperatures and will frequently begin to leak as the metallic coupling means expands due to the heat, or as the resilient sealing gaskets sometimes used between the abutting faces is destroyed by the heat.

Even in cases where the couplings will not be subjected to excessive heating or cooling there are many instances in which it is desirable to safely contain very high pressures. In general, the resilient type sealing gaskets used in couplings of this type will not withstand high working pressures and are for this reason somewhat limited in application. When it is necessary to frequently connect and disconnect a coupling of this type, it has usually been necessary to replace the resilient gasket, if only one is used, each time that the coupling is reconnected. Also, the resilient gaskets are sometimes damaged and the coupling made to leak by mechanical loads placed on the coupling, particularly when the loads are imposed at right angles to the joints of pipe which results in high compression on one side of the gasket and also tension on the connecting means on the other side of the coupling.

The present invention contemplates an improved gasket ring for a coupling having two opposed, annular faces and means for drawing the faces together, the improved gasket ring comprising, in general, a relatively high tensile strength ring having an outer ring portion with a thickness and two inwardly extending, diverging, annular sealing lip portions forming an inwardly facing annular groove between the sealing lip portions, the distance between parts of the annular sealing lip portions being greater than the thickness of the outer ring portion. A resilient sealing ring is preferably disposed between the sealing lip portions and substantially fills the annular groove whereby when the annular faces are drawn together, the annular sealing lip portions will be pressed together by the annular faces to form a high pressure seal with the respective annular faces and the resilient sealing ring will be compressed to form a low pressure seal with the annular faces. The present invention also contemplates improved flange-type and union-type couplings utilizing the improved gasket ring, which couplings will hereafter be described in greater detail.

Therefore, it is an important object of the present invention to provide an improved gasket ring for a fluid conduit coupling having two opposed annular faces and means for drawing the faces together.

Another object of the present invention is to provide an improved gasket ring of the type described which will safely withstand much greater pressure than gaskets previously employed.

Yet another object of the present invention is to provide an improved gasket ring of the type described which can be repeatedly used when a coupling is disconnected and connected without adverse effects.

A still further object of the present invention is to provide an improved gasket ring of the type described which will tend not to leak even though the coupling is subjected to substantial temperature changes which cause the means for drawing the faces together to expand and contract.

Yet another object of the present invention is to provide an improved gasket ring of the type described which will continue to hold high pressure even when subjected to high temperatures as might occur during a fire.

A still further object of the present invention is to provide an improved gasket ring of the type described which can be used in combination with a wide variety of conduit couplings.

Yet another object of the present invention is to provide an improved bolted flange coupling utilizing a gasket ring constructed in accordance with the present invention which will withstand greater mechanical loads without leakage.

Still another object of the present invention is to provide an improved union-type coupling which can be used under greater working pressures, under extreme temperature variations, and under greater mechanical loads without leaking.

Another very important object of the present invention is to provide an improved gasket ring of the type described which is relatively inexpensive to manufacture and has a very long service life.

Many additional objects and advantages of the present invention will be evident to those skilled in the art from the following detailed description and drawings, wherein:

FIG. 1 is a side view of a gasket ring constructed in accordance with the present invention;

FIG. 2 is an enlarged sectional view taken substantially on lines 2—2 of FIG. 1;

FIG. 3 is a longitudinal sectional view of a novel bolted flange-type coupling combination constructed in accordance with the present invention and utilizing the gasket ring of FIG. 1;

FIG. 4 is an enlarged view of a portion of FIG. 3;

Figure 5:
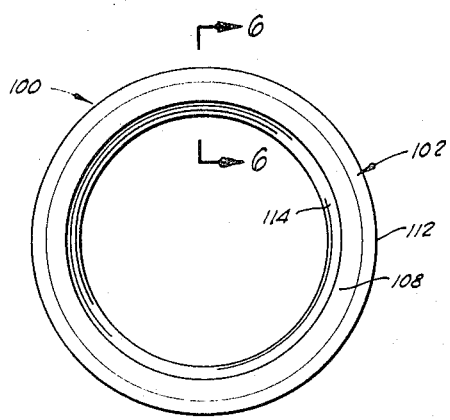
FIG. 5 is a side view of another gasket ring constructed in accordance with the present invention.

Referring now to the drawings, and in particular to FIGS. 1 and 2, a gasket ring constructed in accordance with the present invention is indicated generally by the reference numeral 10. The gasket ring 10 is comprised of an outer ring portion 12 having a longitudinal dimension or thickness $t$, as best seen in FIG. 2. A plurality of apertures or bolt holes 14 are circumferentially spaced around the periphery of the outer ring portion 12. A relatively large fluid passageway 16 is provided in the center of the outer ring portion 12. A pair of diverging, annular sealing lip portions 18 and 20 extend inwardly from the innermost edge of the outer ring portion 12, as can best be seen in FIG. 2, and form an inwardly facing annular groove 22. It will be noted that the innermost edges 18a and 20a of the lip portions 18 and 20, respectively, are spaced a greater distance apart than the thickness $t$ of the outer ring portion 12. The ring portion 12 and in particular the annular lip portions 18 and 20 are preferably fabricated from heat-treated spring steel so that a considerable force will be required to press the two lip portions together and consequently the lip portions will press against the two opposed faces of a coupling with a great pressure, as will hereafter be described in greater detail.

A resilient, low pressure sealing ring 24 is preferably disposed in the inwardly facing groove 22. The resilient sealing ring 24 is preferably a suitable synthetic rubber molded in the annular groove 22 so as to be securely bonded to the walls of the annular groove 22 and also preferably has a pair of inwardly directed sealing lip portions 26 and 28 which form an inwardly directed annular groove. The opposite faces 24a and 24b of the resilient sealing ring 24 are preferably flat and parallel and are flush with the ends of the metal lip portions 18 and 20. The molded synthetic rubber will form a homogeneous and very good seal while fluids will enter the groove 30 and tend to press the lip portions 26 and 28 firmly against the opposed faces of a coupling, as will presently be described.

Referring now to FIGS. 3 and 4, a bolted flange-type coupling utilizing the gasket ring 10 is indicated generally by the reference numeral 32. The coupling 32 includes a pair of coupling members, indicated generally by the reference numerals 34 and 36, which are comprised of tubular sleeve portions 38 and 40 which may be welded or otherwise connected to conduits 42 and 44, respectively. The coupling members 34 and 36 also have flange portions 46 and 48, respectively, which are disposed substantially normal to the longitudinal axes of the tubular sleeve portions 38 and 40 and have opposed planar faces 46a and 48a, which are also disposed normal to the longitudinal axes of the sleeve portions, as can best be seen in FIG. 4. Each of the flange portions 46 and 48 has a plurality of apertures or bolt holes 50 and 52 which are positioned to register with the bolt holes 14 of the outer ring portion 12. A plurality of conventional threaded bolt fastening means 54 pass through the aligned bolt holes 52, 14 and 50 and securely clamp the flange portions 46 and 48 of the coupling members 34 and 36 together and thereby draw the faces 46a and 48a tightly against the opposite sides of the gasket ring 10.

When the bolt fastening means 54 draws the faces 46a and 48a together, the lip portions 18 and 20 are pressed together and the resilient annular sealing ring 24 compressed, as best seen in FIG. 4, until the lip portions 18 and 20 are substantially the same thickness $t$ as the outer ring portion 12. Thus it will be appreciated that the spring steel of the lip portions 18 and 20 will be pressed very tightly against the faces 46a and 48a and will effectively form a high pressure seal due to the strength of the steel. The resilient sealing ring 24 will provide a very effective low pressure seal, and the metal sealing lip portions 18 and 20 will prevent extrusion of the resilient material of the sealing ring 24 when it is subjected to high pressure. Fluid entering the annular groove 30 in the resilient sealing ring 24 will press the lip portions 26 and 28 of the resilient sealing ring 24 tightly against the faces 46a and 48a of the coupling members 46 and 48 because the fluid pressure always acts normal to the surface of the groove 30. Similarly, as the fluid pressure within the conduits 42 and 44 increases, the fluid pressure will wedge the resilient sealing ring 24 between the annular lip portions 18 and 20 and press the lip portions 18 and 20 against the faces 46a and 48a with increasing force to perfect the seal.

In the event the bolt fastening means 54 expand due to heat, the spring steel of the lip portions 18 and 20 will cause the lip portions to spread such that the edges 18a and 20a will remain in firm sealing contact with the annular faces 46a and 48a. Of course this will be assisted by the force exerted on the lip portions 18a and 20a as a result of the fluid pressure. Further, by reason of the fact that the flange portions 46 and 48 are securely tightened against the outer ring portion 12, the flange coupling 32 will have increased mechanical strength when subjected to loads normal to the longitudinal axes of the conduits 42 and 44, as compared to flange couplings employing more conventional sealing gaskets. In tests, the gasket ring 10 has continued to hold high pressures without leaking when the coupling 32 was subjected to extreme temperatures, as high as 900° F., and the resilient rubber sealing ring 24 charred. Further, due to the high resiliency of the spring steel lip portions 18 and 20, the coupling 32 can be connected and disconnected many times without damaging the gasket ring 10. Accordingly, the gasket ring 10 has a very long, useful life which of course results in considerable savings in cases where the coupling must be connected and disconnected periodically for cleaning or other similar purposes.

Figure 6:
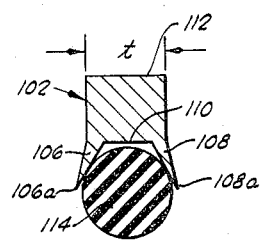
FIG. 6 is a sectional view taken substantially on lines 6—6 of FIG. 5.

Referring now to FIGS. 5 and 6, another gasket ring constructed in accordance with the present invention is indicated generally by the reference numeral 100. The gasket ring 100 is comprised of an outer ring portion 102 which is preferably fabricated from a high tensile strength steel and has a thickness $t$. A pair of spring steel sealing lip portions 106 and 108 extend inwardly from the outer ring portion 102 and form an inwardly facing, annular groove 110. The inwardly extending annular lip portions 106 and 108 diverge such that the innermost edges 106a and 108a are spaced apart a distance greater than the thickness $t$ of the outer ring portion 102. Thus it will be noted that the lip portions 106 and 108 together with the outer ring portion 102 are substantially identical to the lip portions 18 and 20 and the centermost part of the outer ring portion 12 of the gasket ring 10. However, the ring portion 102 has a maximum diameter 112 which is sized to be received in a union-type coupling presently to be described.

Figure 7:
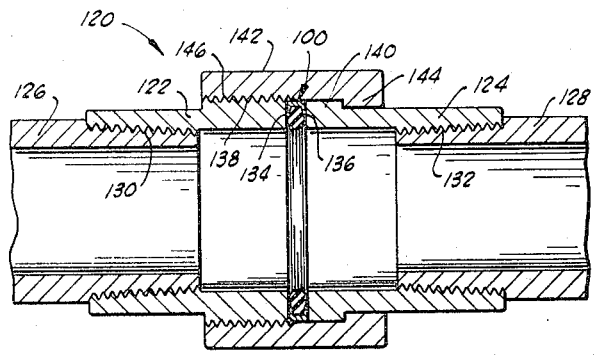
FIG. 7 is a longitudinal sectional view of a novel union-type coupling constructed in accordance with the present invention and utilizing the gasket ring of FIG. 5; and, FIG. 8 is an enlarged view of a portion of FIG. 7.
Figure 8:
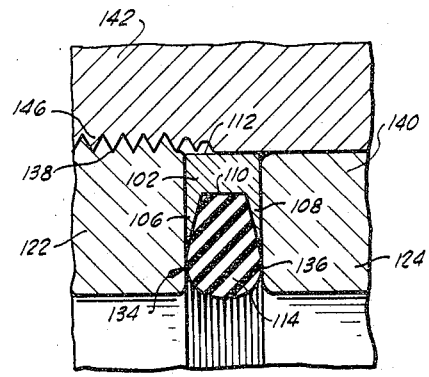

An annular resilient sealing ring 114 is disposed in the annular groove 110. The sealing ring 114 may conveniently be a standard O-ring having a circular cross section, as illustrated in FIG. 6. It will be noted that the cross sectional diameter of the sealing ring 114 is such as to substantially fill the groove 110. It is important that the sealing ring 114 fill the annular groove 110 when the lip portions 106 and 108 are compressed, as will presently be described, so that the resilient sealing ring 114 will engage the opposed faces of the coupling presently to be described. Referring now to FIGS. 7 and 8, a union-type coupling constructed in accordance with the present invention and utilizing a gasket ring 100 is indicated generally by the reference numeral 120. The coupling 120 comprises a pair of tubular coupling members 122 and 124 which are connected to conduits 126 and 128 by internal thread means 130 and 132. The coupling members 122 and 124 have opposed annular faces 134 and 136, as best seen in FIG. 8, which are disposed generally at right angles to the longitudinal axes of the conduits 126 and 128. The coupling member 122 has external thread means 138 adjacent the face 134 and the coupling member 124 has an outwardly extending annular shoulder portion 140 adjacent the annular face 136. A third tubular member 142 has an inwardly directed annular shoulder portion 144 disposed around the smaller diameter of the coupling member 124 and cooperatively engaging the outwardly extending annular shoulder 140 to exert a longitudinal force on the member 124, as will presently be described. The third tubular coupling member 142 also has internal thread means 146 for cooperatively engaging the external thread means 138 on the coupling member 122. Thus it will be evident that when the third coupling member 142 is rotated, the cooperative thread means 138 and 146 will draw the opposed faces 134 and 136 together and compress the gasket ring 100. Of course the coupling force is transmitted through the cooperating annular shoulders 140 and 144.

When the coupling 120 is tightened by rotation of the third tubular member 142, the faces 134 and 136 will be drawn tightly against the outer ring portion 102 and will thereby press the annular sealing lip portions 106 and 108 together substantially to the positions shown in FIG. 8. Of course the annular sealing lip portions 106 and 108 will press against the faces 134 and 136, respectively, with considerable force due to the strength of the spring steel and will thereby form a very tight annular seal. As the sealing lip portions 106 and 108 are pressed together the annular sealing ring 114 will be compressed and deformed until it completely fills the annular groove 110 and also extends into engagement with the faces 134 and 136. The initial compression of the resilient sealing ring 114 will provide a low pressure seal. Then as the pressure increases, the fluid pressure acting on the convex surface of the sealing ring 114 will press the sealing ring more tightly against the faces 134 and 136, and at the same time will wedge the resilient sealing ring 114 between the lip portions 106 and 108 and thereby press the lip portions more firmly against the faces 134 and 136. When the pressure becomes so great as to normally extrude the resilient rubber sealing ring 114 through any finite opening, i.e., pressures on the order of 10,000 p.s.i., the annular sealing lip portions 106 and 108 will provide a high pressure seal and will prevent extrusion of the resilient material of the sealing ring 114.

From the above detailed description of preferred embodiments of the present invention, it will be evident that an improved gasket ring has been described. The gasket ring can be used with any type of coupling having, in general, a pair of opposed annular faces and means for drawing the faces together. The gasket ring will effectively hold very high working pressures under adverse conditions of temperature and mechanical loads. The gasket ring is especially useful when used in steam lines or other areas where it will be subjected to large variations in temperatures because expansion of the means for drawing the opposed faces together will not result in a loosening of the gasket ring due to the action of the spring steel sealing lip portions 18 and 20 of the gasket ring 10, or 106 and 108 of the gasket ring 100. Further, the gasket ring can be relatively economically produced and has a very long life due to the fact that it can be used many times. Two preferred couplings utilizing the broad principle of the present invention have also been described. The flange-type coupling 32 may embody two standard blind faced flanges in combination with the gasket ring 10 to produce a coupling which will effectively hold a very high pressure under a wide range of temperatures and which will have a substantially greater mechanical strength than previous flanges utilizing only resilient sealing gaskets. Similarly, a union-type coupling 120 has been described which will much more effectively hold a higher working pressure under adverse conditions of temperatures and mechanical loadings.

Although a particular embodiment of the present invention has been described in detail, it is to be understood that various changes, substitutions and alterations can be made therein without departing from the spirit and scope of the invention as defined by the appended claims.

What is claimed is:

1. An improved gasket ring for sealing a conduit coupling of the type having two opposed annular faces, said gasket ring comprising:
   a relatively high tensile strength annular member having:
      an outer ring portion characterized in having substantially parallel, radially extending surfaces and a thickness between said surfaces; and
      two spring metal, diverging, annular sealing lips secured to the inner periphery of said outer ring portion and extending radially inwardly therefrom, said spring metal sealing lips being spaced from each other to define an inwardly facing annular groove in said high tensile strength annular member between the sealing lips, the distance between said spring metal sealing lips at their divergent, radially inner ends in the unflexed position thereof being greater than the thickness of said outer ring portion between said surfaces each of said lips further characterized in that the cross-sectional thickness thereof decreases uniformly from the point where said lip joins said outer ring portion to the radially inward portion of said lip whereby a radially inward, relatively sharp edge is formed; and
   an annular resilient sealing ring partially disposed in said annular groove between said spring metal sealing lips and having two inwardly extending, annular sealing lips defining an inwardly facing annular groove in said annular resilient sealing ring, said groove in said resilient sealing ring having pressure surfaces extending substantially parallel to the surface defining and forming the annular groove in said high tensile strength member, and the sealing lips of said resilient sealing ring being further characterized in extending radially inwardly further than said spring metal sealing lips and in being more flexible than said spring metal sealing lips to respond by flexure to lower pressures than said spring metal sealing lips, whereby when the gasket ring is disposed between said annular faces and said faces are drawn together, the annular spring metal sealing lips will be pressed together by the annular faces and form a high pressure seal therewith, and the sealing lips of said resilient sealing ring will contact and seat on said annular faces and form a low pressure seal therewith.

2. An improved gasket ring for a conduit coupling having two opposed annular faces and means for drawing the faces together, the gasket ring comprising:
   a relatively high tensile strength ring comprising
      an outer ring portion having substantially parallel, radially extending surfaces and a thickness between said surfaces, and
      two inwardly extending, diverging, annular sealing lip portions forming an inwardly facing annular groove between the sealing lip portions, the distance between portions of the sealing lip portions in the unflexed position thereof being greater than the thickness of the outer ring portion each of said lips having a cross-sectional thickness which decreases uniformly from the point where said lip joins said outer ring portion toward the radially inward portion of said lip whereby a radially inward relatively sharp edge is formed; and
   an annular body of elastic material molded in said annular groove and completely filling the groove, said annular body of elastic material having two inwardly extending annular sealing lips at opposite edges of said body for engaging the annular faces of said conduit coupling and spaced from each other to define an inwardly facing annular groove,
whereby when the gasket ring is disposed between the annular faces of said coupling and said faces are drawn toward each other, the annular sealing lip portions of said high tensile strength ring will be pressed together by the annular faces and form a high pressure seal therewith, and the resilient sealing ring will contact and seat on the annular faces of said conduit coupling and form a low pressure seal therewith.

References Cited by the Examiner

UNITED STATES PATENTS

| | | | |
|---|---|---|---|
| 2,330,425 | 9/1943 | Hilton | 277—206 X |
| 2,455,982 | 12/1948 | Dowty | 277—180 |
| 2,513,178 | 6/1950 | Jackson | 285—363 |
| 2,783,295 | 2/1957 | Ewing | 277—180 X |
| 3,093,581 | 6/1963 | Pall et al. | 277—231 X |
| 3,215,442 | 11/1965 | Papenguth | 277—180 |

SAMUEL ROTHBERG, *Primary Examiner*.